G. Oerllein,
Horse Power.
No. 93,737. Patented Aug. 17, 1869.

Witnesses: Inventor.

United States Patent Office.

GEORGE OERLLEIN, OF UTICA, MINNESOTA.

Letters Patent No. 93,737, dated August 17, 1869.

IMPROVEMENT IN HORSE-POWERS.

The Schedule referred to in these Letters Patent and making part of the same.

*To all whom it may concern:*

Be it known that I, GEORGE OERLLEIN, of the town of Utica, and county of Winona, and State of Minnesota, have invented a new and useful Improvement in Horse-Powers; and I do hereby declare that the following is a full, clear, and exact description thereof, which will enable those skilled in the art to make and use the same, reference being had to the accompanying drawing, forming part of this specification, in which—

Figure 1:
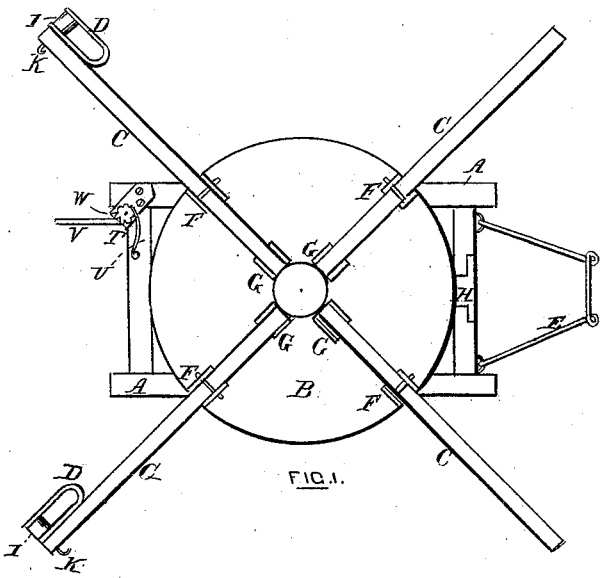
Figure 2:
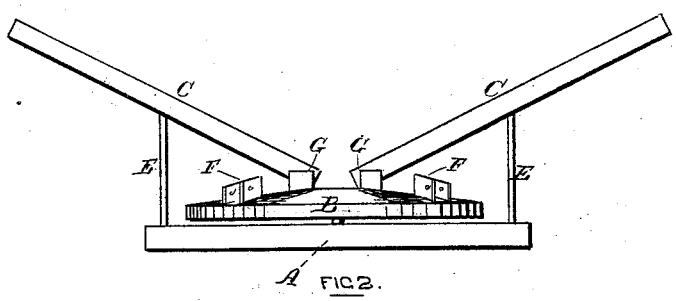
Figures 3, 4:
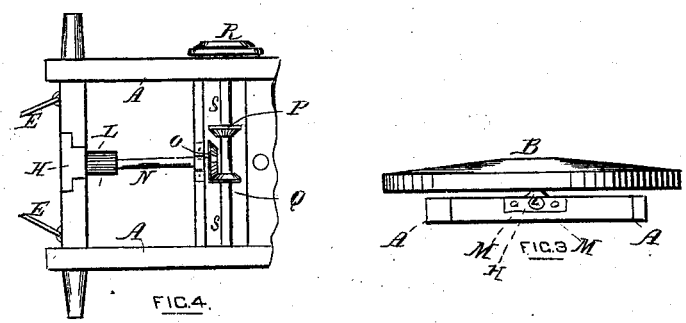

Figure 1 is a plan view of my invention;

Figure 2, a side view;

Figure 3, an end view of the frame and of the master-wheel; and

Figure 4, a sectional view of the frame-work and machinery, with the master-wheel removed.

Similar letters of reference, in each of the figures, indicate corresponding parts.

The object of my invention is to provide sweeps for a horse-power that can be turned round endways of the frame and laid up on stands, so that the power can pass through narrow places; also, for a box that can be taken out endways of the journal, and let the journal be taken out for repair, without disturbing the master-wheel.

A is the frame-work or base of the power.

B, the master-wheel.

D, iron bows on the ends of the sweeps.

E, braces to hold the power in position, and also, when turned up, a rest for the sweeps.

F, irons on the top of the master-wheel, for the sweeps to lay in, with a pin across the top to hold the sweeps in place when driving round the field where there are stumps.

The pins can be drawn out and the sweeps raised, the pins put in again, and the sweeps laid on the top of the pins, which will raise the sweeps high enough to go over any ordinary stump.

G, irons in which the ends of the sweeps are fastened, bolted down to the master-wheel, but so that they can be turned round, as may be desired.

H, a box for a journal of the driving-shaft to run in, fastened in sideways, so that the journal can be taken out and repaired or otherwise without disturbing the master-wheel.

I, rubber springs.

K, hook to hitch the horses to the sweeps, the rubber springs yielding when the horses pull.

L, pinion on driving-shaft N.

M M, screws which hold the box H to the frame.

N, main driving shaft.

O, pinion on main shaft.

P, pinion on cross-shaft.

Q, another pinion on the cross-shaft.

These pinions slip on the cross-shaft; only one of them used at a time. The other slipped back.

R, cog-wheel on the cross-shaft.

S, cross-shaft.

T, ratchet-wheel on a shaft on the corner of the frame.

U, dog which catches in the ratchet-wheel T.

V, rope attached to the shaft, on which is the ratchet-wheel.

W, shaft of the ratchet-wheel.

This ratchet-wheel, dog, and rope, are for the purpose of tightening up the braces and keeping the power steady. The end of the rope is staked to the ground, and a wrench is placed on the head of shaft W and turned round. This pulls on the rop, and the dog U holds whatever is gained, and the rope is drawn taut, and the power is held firmly in place.

Operation.

Hitch the horses to the power, as seen in fig. 1. When you want to go through a narrow place, take out the pins F, raise up the sweeps, and carry them round, as shown in fig. 2, the braces E being raised to hold them up.

When you wish to repair the main shaft, take out the screws M, and take out box H.

What I claim as my invention, and desire to secure by Letters Patent, is—

1. The sweeps C, hinged loosely in the irons G, and resting in the open sockets F, substantially as described.

2. Rubbers I, in combination with bows D and draught-iron K, substantially as described.

3. Box H, arranged so as to slip on to the end of shaft N, substantially as described.

4. Shaft N, pinion O, shaft S, and sliding pinions P and Q, constructed substantially as described.

5. Sliding pinions Q and P, wheel R, and shaft S, constructed substantially as described.

6. Frame A, ratchet-wheel T, dog U, rope V, and shaft W, constructed and arranged substantially as described.

GEORGE OERLLEIN.

Witnesses:
J. B. SMITH,
W. M. HORNOR.